United States Patent
Kimoto et al.

[11] Patent Number: 5,422,878
[45] Date of Patent: Jun. 6, 1995

[54] INTER-NETWORK ROUTING CONTROL METHOD AND SWITCHING NETWORK SYSTEM

[75] Inventors: Atsushi Kimoto, Hadano; Michio Suzuki, Odawara; Hironari Sakai, Yokohama, all of Japan

[73] Assignees: Hitachi, Ltd., Tokyo; Hitachi Software Engineering Co., Ltd., Yokohama, both of Japan

[21] Appl. No.: 799,938

[22] Filed: Nov. 29, 1991

[30] Foreign Application Priority Data

Nov. 30, 1990 [JP] Japan ............................ 2-330710

[51] Int. Cl.⁶ .............................................. H04L 12/56
[52] U.S. Cl. ................................ 370/60; 370/85.13
[58] Field of Search ............... 370/14, 16, 94.1, 60, 370/94.3, 85.13, 85.14, 17, 94.2, 85.7, 95.1; 379/219, 220, 221; 340/825.03, 825.02, 827

[56] References Cited

U.S. PATENT DOCUMENTS

| | | | |
|---|---|---|---|
| 4,627,052 | 12/1986 | Hoare et al. | 370/85.13 |
| 4,706,081 | 11/1987 | Hart et al. | 370/61 |
| 4,933,938 | 6/1990 | Sheehy | 370/85.13 |
| 4,975,906 | 12/1990 | Takiyasu et al. | 370/85.13 |
| 5,018,133 | 5/1991 | Tsukakoshi et al. | 370/85.6 |
| 5,027,350 | 6/1991 | Marshall | 370/94.1 |

FOREIGN PATENT DOCUMENTS

0224441  9/1988  Japan.

*Primary Examiner*—Douglas W. Olms
*Assistant Examiner*—Ajit Patel
*Attorney, Agent, or Firm*—Antonelli, Terry, Stout & Kraus

[57] ABSTRACT

An inter-network routing control method for selecting the optimum gate station in a packet network connected to another network via a plurality of gate stations. A representative gate station can be specified for each addressed network. Upon an inter-network switching call request, the switch station transfers the call request to a representative gate station, and the representative gate station decides the optimum gate station. It is possible to lighten the load on the switch station at the time of inter-network switching communication and facilitates changing the configuration of gate stations in the packet network.

13 Claims, 9 Drawing Sheets

N1~N3: PACKET SWITCHING NETWORKS
G1.G2: GATE STATIONS
P1~P3: SWITCH STATIONS
T1~T3: TERMINALS

FIG. 1

N1~N3: PACKET SWITCHING NETWORKS
G1, G2: GATE STATIONS
P1~P3: SWITCH STATIONS
T1~T3: TERMINALS

INTER-NETWORK ROUTING CONTROL METHOD AND SWITCHING NETWORK SYSTEM

BACKGROUND OF THE INVENTION

The present invention relates to inter-network switching for packet switching network, and in particular to an inter-network routing control method capable of selecting the optimum gate station and the optimum inter-network circuit.

As prior art relating to inter-network routing control, a technique described in JP-A-63-224441, for example, is known.

When the optimum gate device is to be selected at the time of inter-network switching in the prior art, respective calling terminals store states of gate devices and a calling terminal directly selects a gate device, specifies the address of that gate device as the called address for inter-network relay, and issues a call.

In case the above described prior art is applied to a packet switching network, that packet switching network is so configured that a switch station accepting a call from a terminal may store and update states of all gate stations included in the packet switching network, select a gate station by referring to the states at the time of inter-network switching, and transfer a call request. Further, the packet switching network is so configured that the following operation may be performed. When the selected gate station cannot be connected to another network, that gate station returns busy information to the calling station and the calling station which has received the busy information selects another gate station and retransfers the call request.

In a packet switching network using such a method, a burden upon the switch station is heavy, and in addition all of gate station information defined on respective switch stations must be replaced when the configuration of the gate stations is to be changed, resulting in a problem of lack of flexibility as the system.

SUMMARY OF THE INVENTION

An object of the present invention is to provide a flexible inter-network routing control method capable of solving the above described problem of the prior art, lightening the burden on the switch station side, and easily coping with a change in the configuration of the gate stations.

In accordance with the present invention, the above described object is achieved by conducting, on the gate station, gate station selection processing at the time of inter-network switching and switching request transfer processing at the time of busy state of the gate station.

That is to say, the above described object is achieved by defining a representative gate station on an inter-network switching routing table in a switch station connected to a terminal, defining a gate station selection table and a circuit selection table in a gate station, defining the optimum gate station by referring to the above described tables in the switch station and gate station when selecting a gate station at the time of inter-network switching, and making the optimum gate station issue a call request to an adjacent network.

By referring to an inter-network routing table, a switch station which has received a call request of inter-network switching from a terminal selects a representative gate station corresponding to the called network address within the address of called terminal and transfers the call request to that representative gate station. The representative gate station which has received the call request selects the optimum gate station by referring to the gate station selection table in order to render loads of gate stations uniform, and retransfers that call request to the optimum gate station. In order to render loads of inter-network circuits uniform, the optimum gate station selects the optimum inter-network circuit by referring to the circuit selection table.

By using such a method, it becomes unnecessary for each switch station to administer the gate station states. Further, at the time of inter-network switching, the calling station need not directly specify a gate station. Therefore, the burden of inter-network switching on the switch station side can be lightened.

Further, by making inter-network switching routing tables defined by respective switch stations common and simple, the definition of system configuration can be simplified. As a result, addition and deletion of gate stations and change of configuration of an inter-network circuit connected to a gate station can be easily performed.

In case inter-network switching is impossible at the optimum gate station selected according to the gate station selection table because of faults in all inter-network circuits, another gate station can be selected by referring to the gate station selection table again. Thereby inter-network switching can be conducted from the second best gate station.

DESCRIPTION OF THE PREFERRED EMBODIMENTS

An embodiment of an inter-network routing control method according to the present invention will hereafter be described in detail by referring to the drawings.

Figure 1:
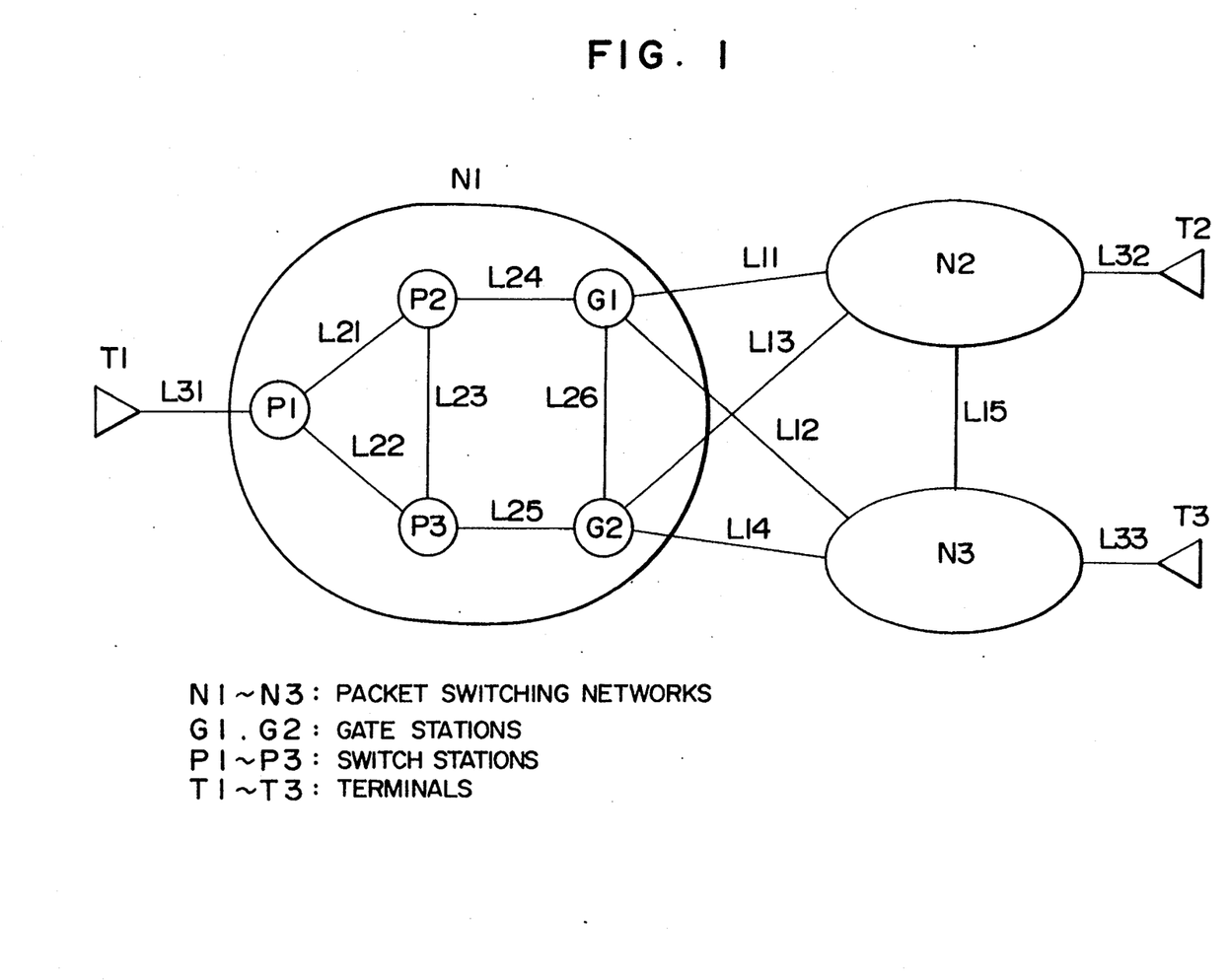
FIG. 1 is a block diagram showing an example of system configuration of packet switching networks whereto the present invention is applied.

FIG. 1 is a block diagram showing an example of system configuration of packet switching networks whereto the present invention is applied. In FIG. 1, N1 to N3 denote independent packet switching networks, P1 to P3 switch stations, G1 and G2 gate stations, and T1 to T3 terminals.

A packet switching network N1 includes the switch stations P1 to P3 and the gate stations G1 and G2. The system shown in FIG. 1 includes the packet switching network N1 and the packet switching networks N2 and N3 mutually connected by inter-network relay circuits L11 to L15. Although not illustrated in FIG. 1, the packet switching networks N2 and N3 also include a plurality of switch stations and gate stations. Terminals are connected to the switch stations P1 to P3 and switch stations which are not illustrated. In FIG. 1, the terminals T1 to T3 are connected to the switch stations by terminal circuits L31 to L33.

Further, the switch stations P1 to P3 and the gate stations G1 and G2 in the packet switching network N1 are interconnected via intra-network trunk circuits L21 to L26.

Figure 2:
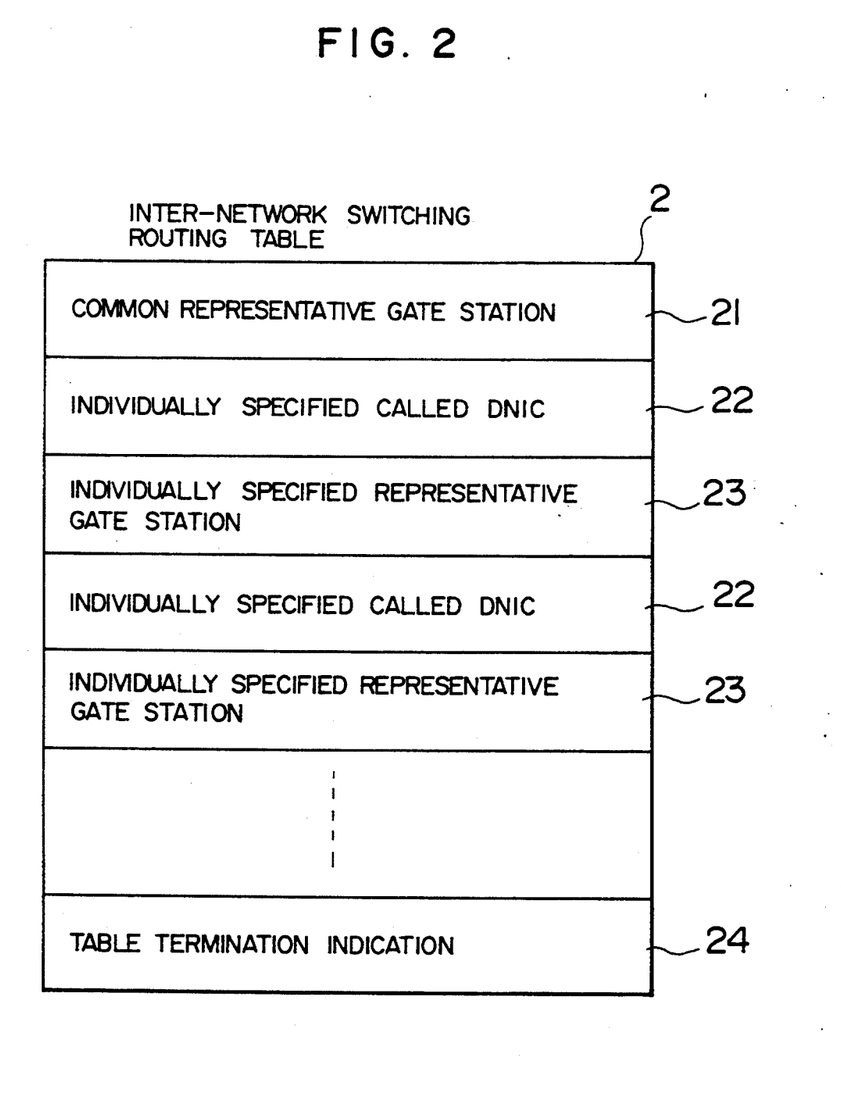
FIG. 2 is a diagram illustrating the configuration of an inter-network switching routing table defined on a switch station.

FIG. 2 is a diagram illustrating the configuration of an inter-network switching routing table defined on a switch station.

In an inter-network switching routing table 2 provided and defined in each switch station, a common representative gate station 21, an individually specified called DNIC 22, and an individually specified representative gate station 23 for the DNIC 22 are defined. The individually specified called DNIC 22 is a DNIC of the called network used when gate stations other than the common representative gate station 21 are desired to be individually specified as representative gate stations depending upon called networks. The term "DNIC" is the abbreviation of data network identification code, and it is an identifier of a packet switching network conforming to CCITT recommendations X. 121. In the table, a table termination indication 24 is provided. As many individually specified called DNICs 22 and individually specified representative gate stations 23 as the number of representative gate stations desired to be individually specified are successively defined.

The inter-network switching routing table 2 shown in FIG. 2 has the same contents in all switch stations. Typically, it will suffice to only define the common representative gate station 21.

Figure 3:
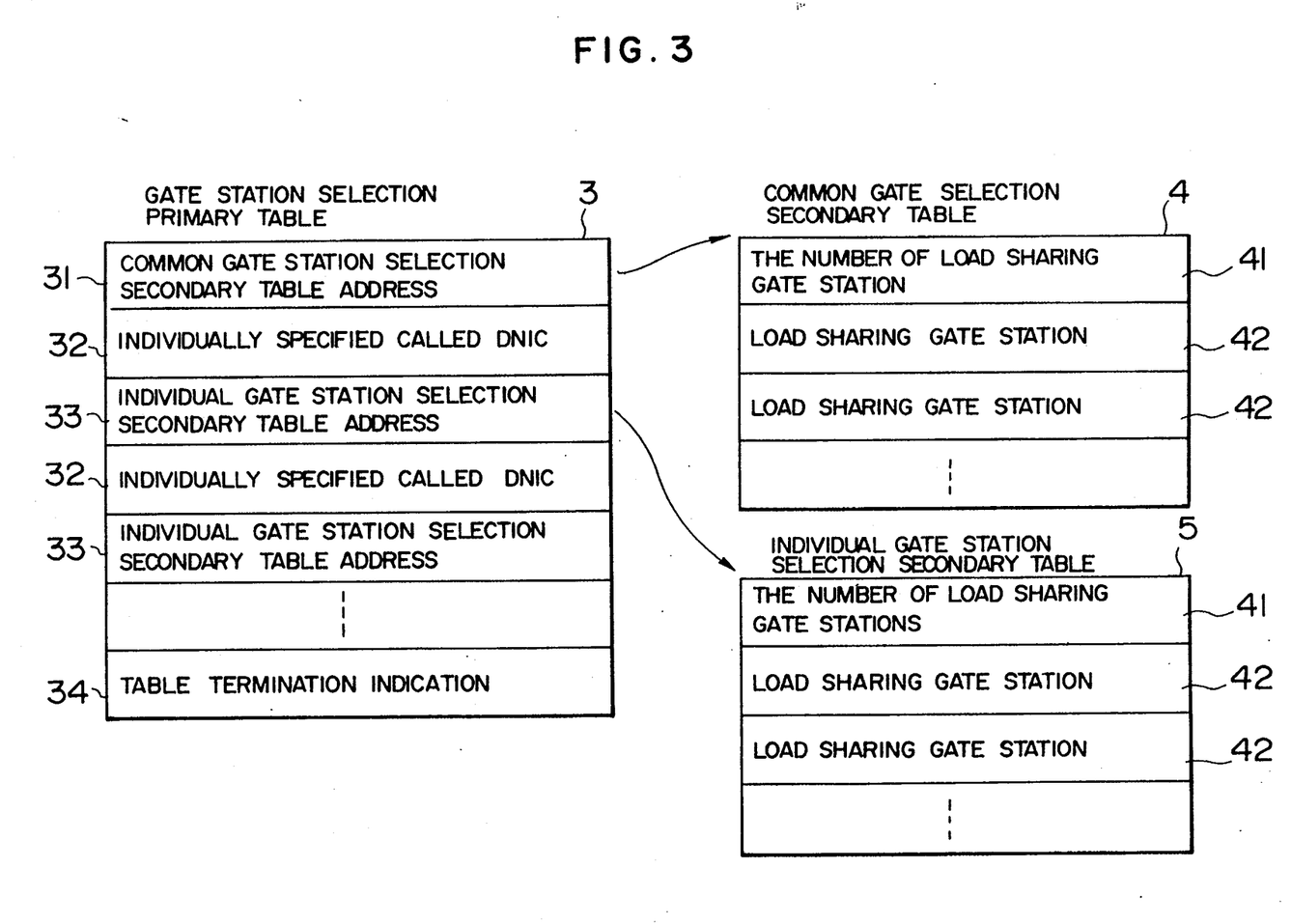
FIG. 3 is a diagram illustrating the configuration of a gate station selection table defined on a gate station.

FIG. 3 is a diagram illustrating the configuration of a gate station selection table defined on a gate station.

As shown in FIG. 3, the gate station selection table includes a gate station selection primary table 3, a common gate selection secondary table 4 which is a secondary table, and an individual gate station selection secondary table 5. Numeral 31 in the gate station selection primary table 3 denotes an address of the common gate station selection secondary table 4. Numerals 32 and 33 respectively denote an individually specified called DNIC and address of an individual gate station selection secondary table 5 which are defined according to the called network when it is desired to define gate station selection secondary tables individually. Numeral 34 denotes termination of the gate station selection primary table.

The above described individually specified called DNICs 32 and addresses 33 of individual gate station selection secondary tables 5 are successively defined as many secondary tables as it is desired to individually specify. Therefore, the individual gate station selection secondary tables 5 are prepared as many as they are defined.

Numeral 41 in the common gate station selection secondary table 4 denotes the number of gate stations registered in this secondary table 4 as load sharing gate stations. Numeral 42 denotes each of those load sharing gate stations. It is now assumed that load sharing gate stations typically include the pertinent gate station itself.

The table shown in FIG. 3 has the same contents in all gate stations. In a packet switching network having a plurality of gate stations with the object of load sharing and risk sharing, it will suffice to only define a common secondary table as the secondary table.

Figure 4:
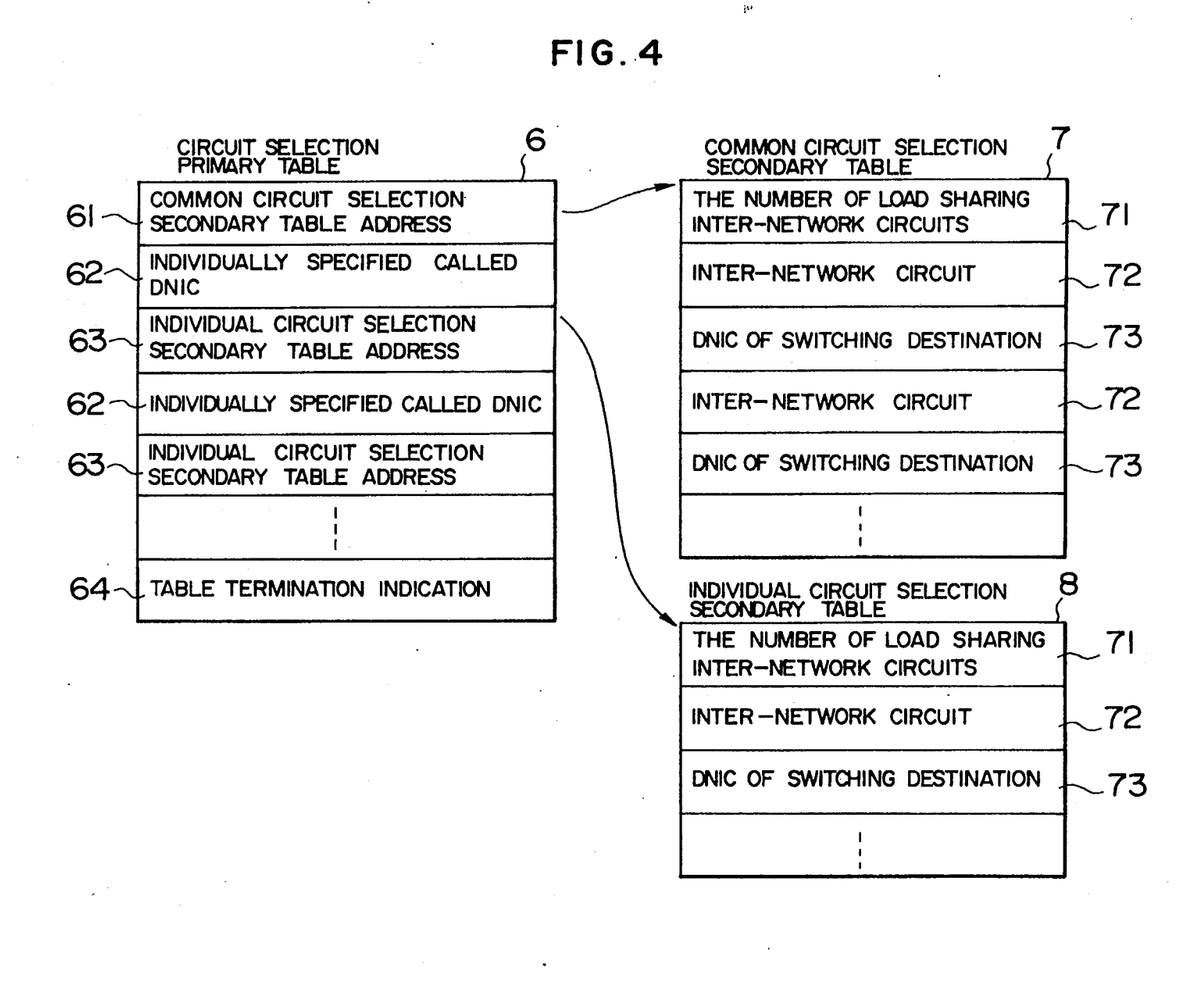
FIG. 4 is a diagram illustrating the configuration of a circuit selection table defined on a gate station.

FIG. 4 is a diagram illustrating the configuration of a circuit selection table defined on a gate station.

As shown in FIG. 4, the circuit selection table includes a circuit selection primary table 6, a common circuit selection secondary table 7, and an individual circuit selection secondary table 8.

Numeral 61 in the circuit selection primary table 6 denotes address of a common circuit selection secondary table 7. Numerals 62 and 63 respectively denote an individually specified called DNIC and address of an individual circuit selection secondary table 8 which are used when it is desired to define circuit selection secondary tables 8 individually and which are associated with a called network. Numeral 64 denotes termination of the primary table 6. The individually specified called DNICs 62 and addresses 63 of individual circuit selection secondary tables 8 are successively defined as many secondary tables as it is desired to individually specify. Therefore, the individual circuit selection secondary tables 8 are prepared as many as they are defined.

Numeral 71 in the common circuit selection secondary table 7 denotes the number of inter-network relay circuits included in inter-network relay circuits of the pertinent gate station and registered in the secondary table 7 as load sharing inter-network relay circuits. Numeral 72 denotes an inter-network circuit. Numeral 73 denotes a DNIC whereto the inter-network circuit is switched.

The circuit selection tables shown in FIG. 4 vary according to the switching configuration of inter-network relay circuits of the gate station. Therefore, contents of the tables differ with gate stations. In case a plurality of inter-network relay circuits are connected to one gate station with the object of load sharing and risk sharing, however, it will suffice to only define a common secondary table as the secondary table.

Figure 5:
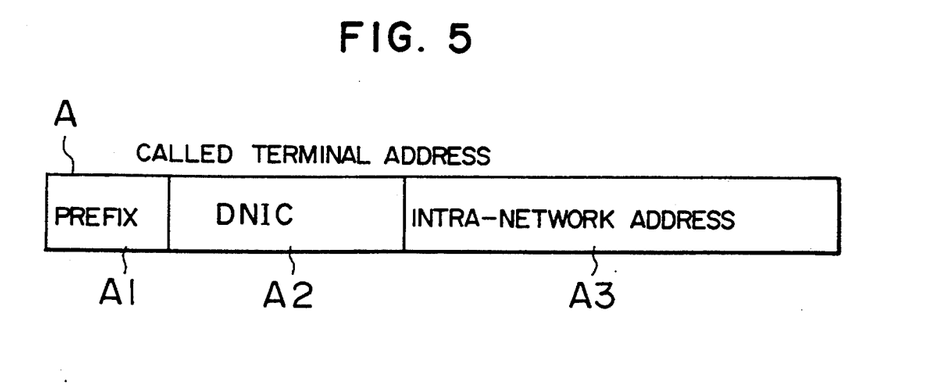
FIG. 5 is a diagram illustrating the form of a called terminal address specified in a call request packet by a terminal at the time of inter-network switching request.

FIG. 5 is a diagram illustrating the form of a called terminal address specified within a call request packet by a terminal when the terminal requests inter-network switching.

The called terminal address A includes a prefix A1 having one digit indicating that the address begins with DNIC, a called network identifier A2 having four digits indicating the DNIC of the called network, and an intra-network address A3 representing the called terminal in the called network with ten digits or less.

Figure 6:
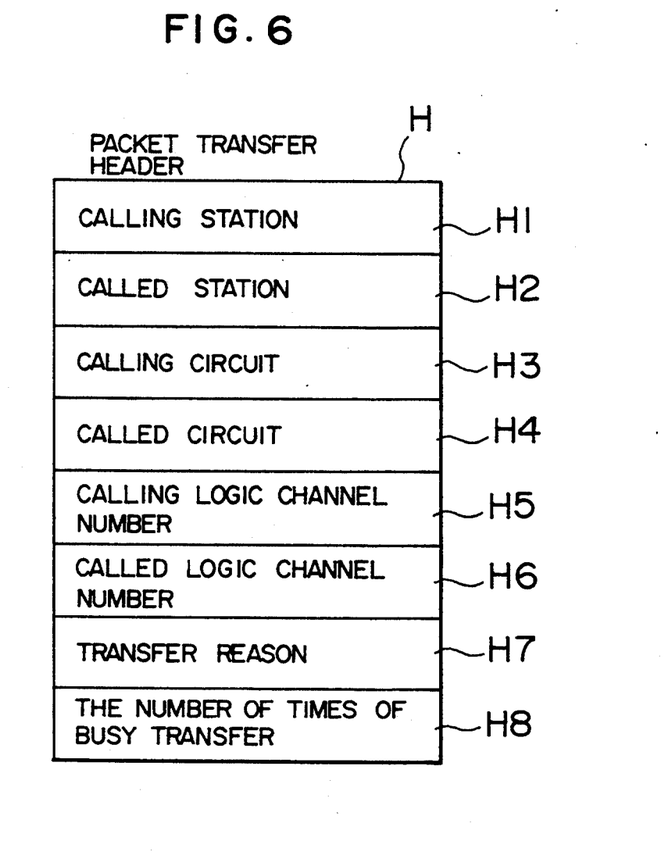
FIG. 6 is a diagram illustrating the configuration of a packet transfer header added when a call request packet is transferred in the network between a switch station and a gate station.

FIG. 6 is a diagram illustrating the configuration of a packet transfer header added when a call request packet is transferred within a network between a switch station and a gate station.

The illustrated packet transfer header H includes a calling station H1 indicating a switch station which has received a call request from a calling terminal, a called station H2 indicating a gate station of transfer destination, a calling circuit H3 indicating a calling terminal circuit, a called circuit H4 indicating an inter-network relay circuit in the gate station, a calling logic channel number H5 indicating the logic channel number of the calling terminal, a called logic channel number H6 indicating the logic channel number used when the gate station issues a call to an adjacent network, transfer reason H7 representing whether the transfer is caused by transfer to the representative gate station or retransfer to the optimum gate station, and the number of busy transfers H8 indicating the number of transfers performed when the call is retransferred because the optimum gate station is busy.

An answer packet for the call request is returned from the gate station finally decided to the calling switch station. At this time, however, all of the calling and called addresses of H1 to H6 in the packet transfer header H are so reversed that calling addresses may become called addresses, and vice versa.

Figure 7:
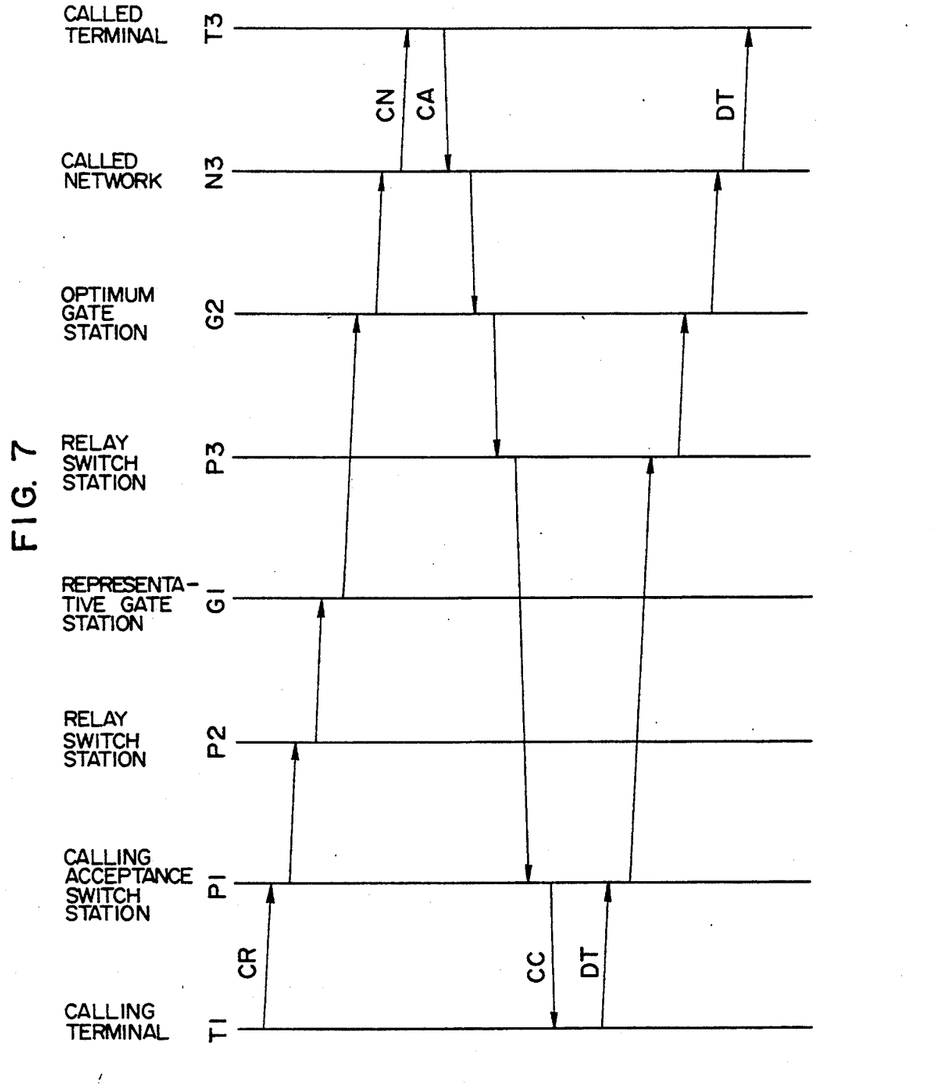
FIG. 7 is a diagram showing a packet transmission sequence at the time of inter-network switching.

FIG. 7 is a diagram showing the packet transmission sequence at the time of inter-network switching. In FIG. 7, CR denotes a call request packet, CN an incoming call packet, CA a call accepted packet, CC a call connected packet, DT a data packet after call connection.

FIG. 7 shows an example in which the calling terminal is T1 and the called terminal is T3. The call request packet CR is transferred to the optimum gate station such as the gate station G2 via a representative gate station such as the gate station in this example. However, the answer packet and the data packet after call connection are directly transferred between the finally decided gate station and the calling switch station without passing through the representative gate station. Thereby the embodiment of the present invention is so configured that passing the above described packets through the representative gate station at the time of inter-network switching may not affect significantly the whole system with respect to traffic.

Figure 8:
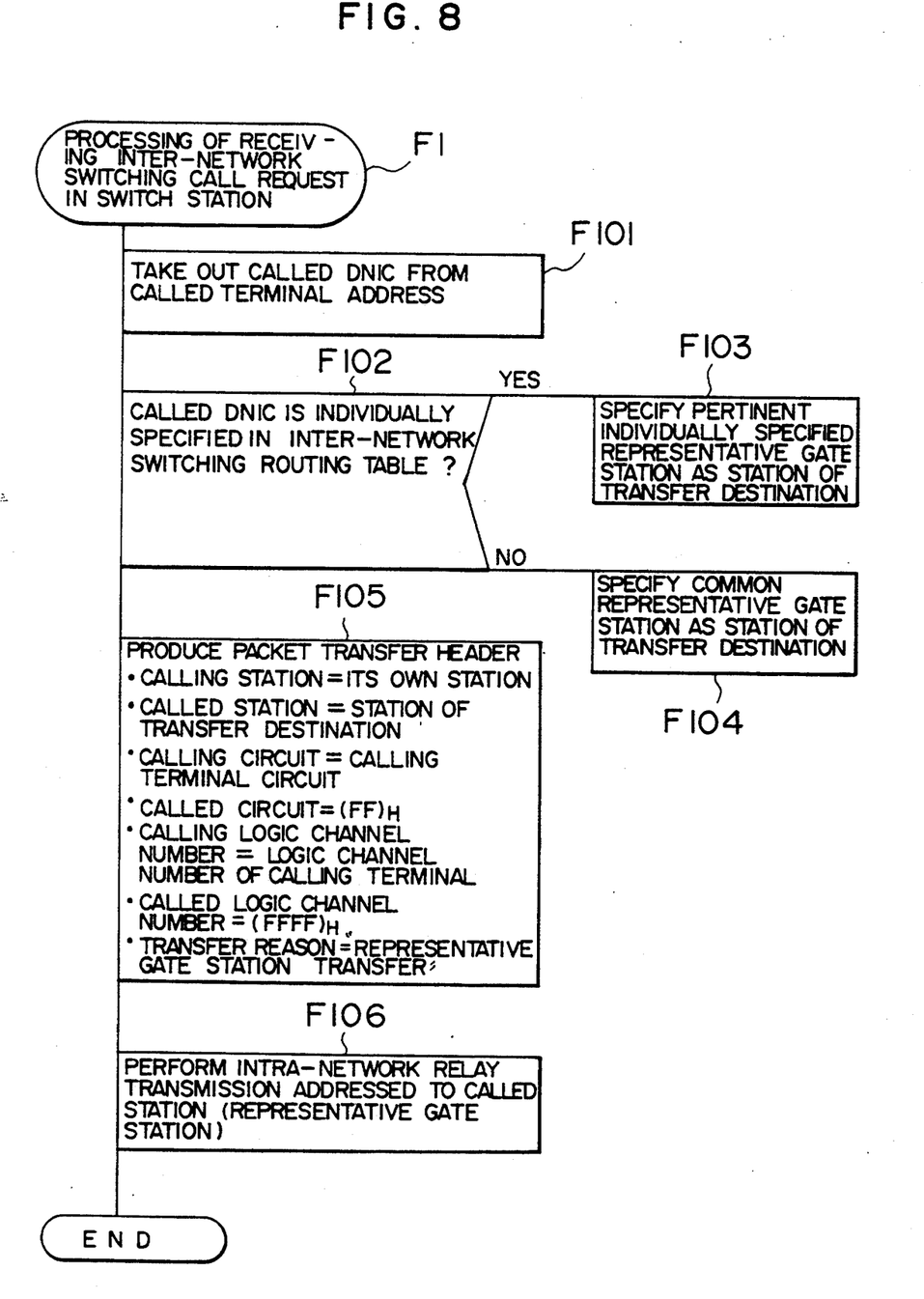
FIG. 8 is a flow chart illustrating the processing procedure followed in a switch station.
Figure 9A:
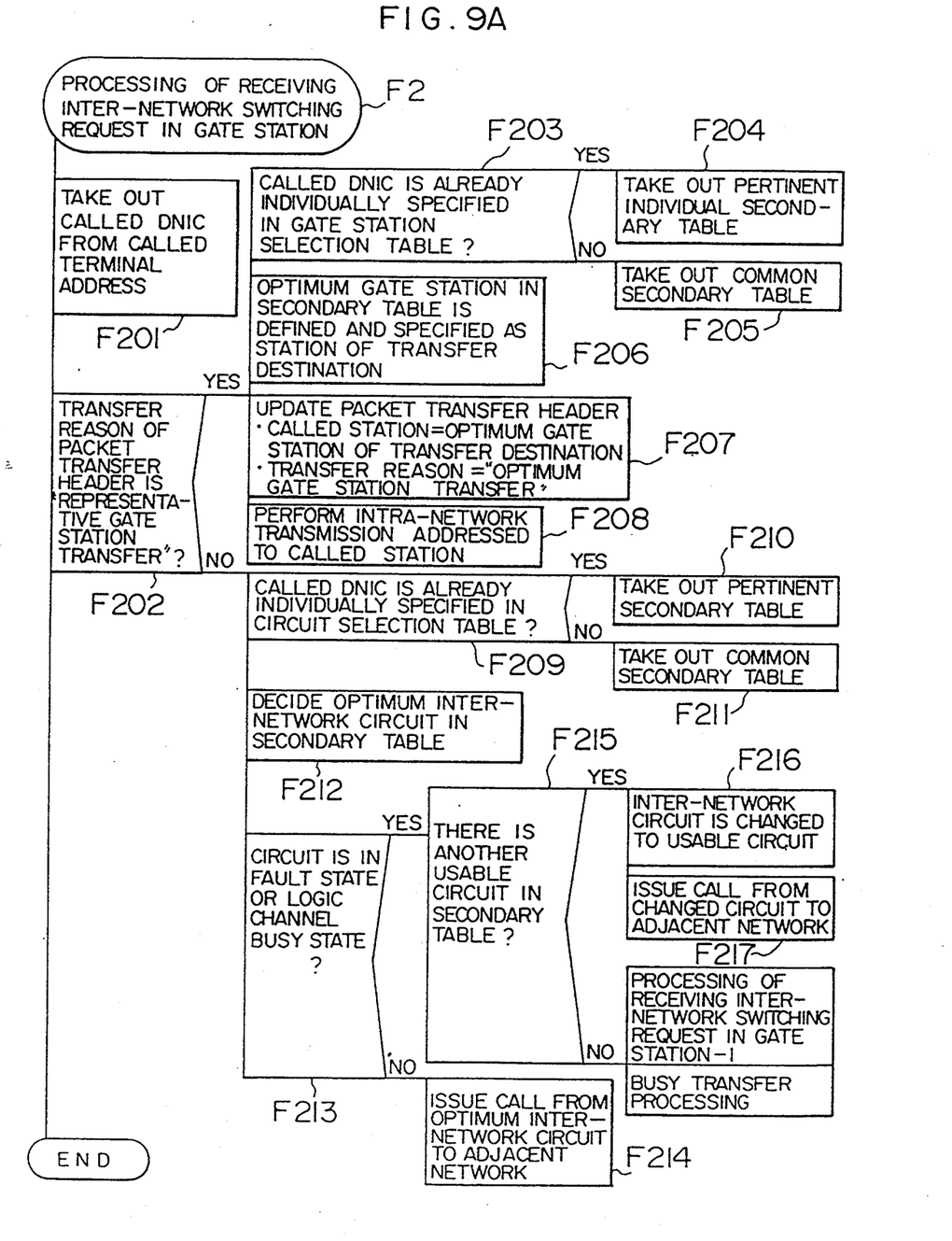
FIG. 9A and 9B together illustrate a flow chart of the processing procedure followed in a gate station.
Figure 9B:
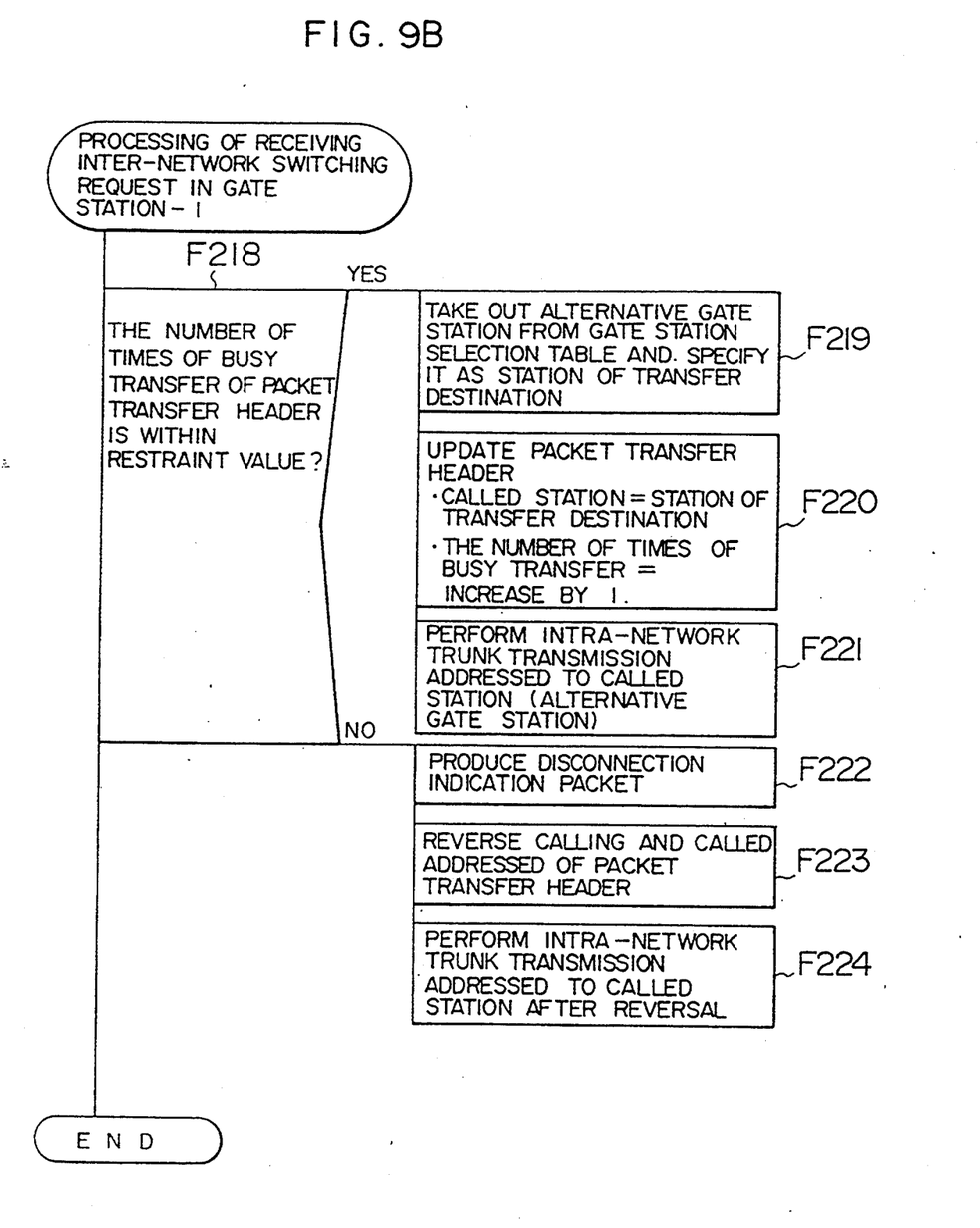

FIG. 8 is a flow chart illustrating the processing procedure followed in a switch station. FIG. 9 is a flow chart illustrating the processing procedure followed in a gate station. Processing performed in the switch station and the gate station will hereafter be described by referring to these flow charts.

First of all, processing F1 performed in a switch station when an inter-network switching call request packet has been received from a terminal will now be described by referring to FIG. 8.

(1) When a switch station has received an inter-network switching call request packet, the DNIC of the called network is taken out from the called terminal address A in the packet described before with reference to FIG. 5 (step F101).

(2) It is then determined whether the pertinent DNIC is already defined in the individually specified called DNIC 22 included in the inter-network routing table 2. If already defined, the pertinent individually specified representative gate station 23 is specified as the station of transfer destination (steps F102 and F103).

(3) If it is found at the step F102 that the individually specified called DNIC 22 is not already defined, the common representative gate station 21 is defined as the station of transfer destination (step F104).

(4) On the basis of specification in the steps F103 and F104, the packet transfer header H is produced and intra-network relay transmission addressed to the representative gate station specified as the station of transfer destination is performed (steps F105 and F106).

In the above described processing of the step F105, the packet transfer header H has calling station H1 set at its own switch station, called station H2 set at the gate station of transfer destination, calling circuit H3 set at the calling terminal circuit, and the calling logic channel number H5 set at the logic channel number of the calling terminal. Since called circuit H4 and the logic channel number H6 are not definitely fixed yet, however, "FFFF" is set. Transfer reason H7 is set at "representative gate station transfer", and the number of times of busy transfer H8 is set at "0".

The called circuit H4 and the called logic channel number H6 are definitely fixed when the gate station and the inter-network relay circuit are finally decided.

Processing F2 performed in the gate station when the inter-network switching call request packet is received will now be described by referring to FIG. 9A and 9B.

(1) When a transfer packet of inter-network switching call request is received by the gate station, the DNIC A2 of the called network is taken out (step F201).

(2) The transfer reason H7 in the packet transfer header H is checked. It is determined whether the transfer reason H7 is "representative gate station transfer" (step F202).

(3) If the transfer reason H7 is "representative gate station transfer" at the step F202, it is determined whether the pertinent DNIC is already defined in the individually specified called DNIC 32 of the gate station selection primary table 3. If it is already defined, the pertinent individual gate station selection secondary table 5 is taken out. Unless it is already defined, the common gate station selection secondary table 4 is taken out (steps F203 to F205).

(4) The optimum gate station in the secondary table taken out at the step F204 or F205 is determined and specified as the station of transfer destination. The called station of the packet transfer header H is updated to become the optimum gate station of transfer destination, and the transfer reason is updated to become the "optimum gate station transfer". Intra-network transmission of a packet addressed to the station of transfer destination is performed (steps F206 to F208).

At step F206, the sum of the calling circuit H3 and the calling logic channel number H5 in the packet transfer header H is divided by the number of load sharing gate stations 41. On the basis of the remainder thus calculated, random numbers are generated. By using the random number, load sharing gate stations 42 in the gate station selection secondary table 4 or 5 are searched. Thereby, load sharing is performed. The processing of deciding the optimum gate station is thus performed at the step F206.

(5) If the transfer reason H7 is "optimum gate station transfer" at the step F202, it is determined whether the pertinent DNIC is already defined in the individually specified called DNIC 62 of the circuit selection primary table 6. If it is already defined, the pertinent individual circuit selection secondary table 8 is taken out. Unless it is already defined, the common circuit selection secondary table 7 is taken out (steps F209 to F211).

(6) The optimum inter-network circuit in the secondary table taken out at the step F210 or F211 is decided. It is determined whether the pertinent circuit is in the fault state or in the logic channel busy state(steps F212 and F213).

(7) If the pertinent circuit is in neither of abnormal states at the step 213, then the decided circuit is judged to be usable, the pertinent circuit is definitely fixed as the final X. 75 interface port, and the call is issued to an adjacent network by using this circuit (step F214).

(8) If the decided optimum inter-network circuit is in either abnormal state at the step 213, it is determined whether there is another usable circuit in the circuit selection secondary table 7 or 8. If there is a usable circuit, then that circuit is definitely fixed as the final X. 75 interface port, and a call is issued from this circuit to an adjacent network (steps F215 to F217).

(9) If all of the inter-network circuits in the circuit selection secondary table 7 or 8 are unusable at the step F215, it is determined whether the number of times of busy transfer H8 in the packet transfer header H does not exceed a restraint value (step F218).

(10) If the number of times of busy transfer H8 is within the restraint value at the step F218, then another gate station is taken out from the gate station selection secondary table 4 or 5 taken out by the same processing as that of the steps F203 to F205 and specified as the station of transfer destination, the called station H2 of the packet transfer header H is updated to become the transfer destination, the number of times of busy transfer H8 is increased by 1, and intra-network relay transmission addressed to the gate station specified as the station of transfer destination is performed (steps F219 to F221).

(11) If the number of times of busy transfer H8 exceeds the restraint value at the step F218, then the switching is judged to be impossible, a disconnection indication packet is produced, the calling and called addresses H1 to H6 in the packet transfer header H are so reversed that calling addresses may become called addresses, and vice versa, and intra-network relay transfer addressed to the call accepting switch station, which is the called station after the reversal, is performed (steps F222 to F224).

At the above described step F212, the sum of the calling circuit H3 and the calling logic channel number H5 in the packet transfer header H is divided by the number of load sharing inter-network circuits 71. On the basis of the remainder thus calculated, random numbers are generated. By using the random number, inter-network circuits 72 in the circuit selection secondary table 7 or 8 are searched. Thereby, load sharing is performed and a circuit is selected. If the DNIC whereto the selected circuit is switched is the DNIC A2 of the called network, that circuit is decided as the optimum inter-network circuit. If the DNIC whereto the selected circuit is switched is another DNIC and there is another circuit included in the circuit selection secondary table 7 or 8 and directly connected to the called network, then that circuit is decided as the optimum inter-network circuit. If the DNIC whereto the selected circuit is switched is another DNIC and a circuit included in the circuit selection secondary table 7 or 8 and directly connected to the called network is not present, then the circuit selected first is decided as the optimum inter-network circuit. Such processing is executed at the step F212.

In case inter-network switching communication is performed between packet switching networks, the above described embodiment of the present invention makes it possible for the representative gate station to select the optimum gate station in due consideration of load sharing between gate stations. Therefore, it will suffice for the switch station to transfer the call request to the representative gate station without being conscious of the gate station configuration in the packet switching network. Even if the optimum gate station is busy, that call request can be automatically transferred to another gate station.

As heretofore described, the present invention makes it possible to realize the optimum gate station selection, the optimum inter-network circuit selection, and switching request transfer when the gate station is busy, by means of only the processing in the gate station. Therefore, the burden on the switch station can be lightened. Further, by making the tables concerning inter-network switching, the gate station configuration can be easily changed. Such effects can be obtained.

We claim:

1. In a switching network including a switch station and a plurality of gate stations for performing inter-network switching via the switch station and one of the gate stations by selecting a relay route, an inter-network routing control method comprising the steps of:

selecting, at said switch station, a representative gate station corresponding to a network address to be called in response to a call request in accordance with an inter-network switching routing table defining the representative gate station being used for representatively receiving said call request, said inter-network switching routing table being provided in the switch station;

selecting, at said representative gate station, in response to a representative receipt of said call request, an optimum gate station from the gate stations in accordance with a gate station selection table for switching said call request from one of said gate stations to another of said gate stations, said gate station selection table being provided in the gate stations; and selecting, at said optimum gate station, an optimum inter-network circuit in accordance with a circuit selection table defining inter-network circuits so as to correspond to the addressed network, said circuit selection table being provided in the gate stations.

2. An inter-network routing control method according to claim 1, wherein an arbitrary one of the gate stations within the network can be selected as said representative gate station.

3. An inter-network routing control method according to claim 2, wherein the representative gate station is not single, but can be defined for each switching destination.

4. An inter-network routing control method according to claim 1, wherein the representative gate station is not single, but can be defined for each switching destination.

5. An inter-network routing control method according to claim 1, wherein in case inter-network switching is impossible in said optimum gate station, another gate station is selected by means of said gate station selection table.

6. In a switching network including a switch station and a plurality of gate stations for performing inter-network switching via the switch station and one of the gate stations by selecting a relay route, an inter-network routing control method comprising the steps of:

selecting a representative gate station in response to a call request in accordance with an inter-network switching routing table defining the representative gate station, said inter-network switching routing table being provided in the switch station;

selecting an optimum gate station from the gate stations in accordance with a gate station selection table for switching said call request one of said gate stations to another of said gate stations said gate station selection table being provided in the gate stations; and selecting an optimum inter-network circuit in accordance with a circuit selection table defining inter-network circuits so as to correspond to the addressed network, said circuit selection table being provided in the gate stations;

wherein said gate station selection table renders loads of gate stations uniform and make it possible to select the optimum gate station so as to correspond to the addressed network, and said circuit selection table makes it possible to select the optimum inter-network circuit.

7. An inter-network routing control method according to claim 6, wherein an arbitrary gate station within the network can be specified as said representative gate station.

8. An inter-network routing control method according to claim 7, wherein in case inter-network switching is impossible in said optimum gate station, another gate station is selected by means of said gate station selection table.

9. An inter-network routing control method according to claim 6, wherein the representative gate station is not single, but can be defined for each switching destination.

10. An inter-network routing control method according to claim 6, wherein in case inter-network switching is impossible in said optimum gate station, another gate station is selected by means of said gate station selection table.

11. In a switching network including a switch station and a plurality of gate stations for performing inter-network switching via the switch station and one of the gate stations by selecting a relay route, an inter-network routing control method comprising the steps of:

selecting a representative gate station in response to a call request in accordance with an inter-network switching routing table defining the representative gate station, said inter-network switching routing table being provided in the switch station;

selecting an optimum gate station from the gate stations in accordance with a gate station selection table for switching said call request from one of said gate stations to another of said gate stations, said gate station selection table being provided in the gate stations; and selecting an optimum inter-network circuit in accordance with a circuit selection table defining inter-network circuits so as to correspond to the addressed network, said circuit selection table being provided in the gate stations;

wherein an arbitrary gate station within the network can be specified as said representative gate station;

wherein in case inter-network switching is impossible in said optimum gate station, another gate station is selected by means of said gate station selection table.

12. In a switching network including a switch station and a plurality of gate stations for performing inter-network switching via the switch station and one of the gate stations by selecting a relay route, an inter-network routing control method comprising the steps of:

selecting a representative gate station in response to a call request in accordance with an inter-network switching routing table defining the representative gate station, said inter-network switching routing table being provided in the switch station;

selecting an optimum gate station from the gate stations in accordance with a gate station selection table for switching said call request from one of said gate stations to another of said gate stations, said gate station selection table being provided in the gate stations; and selecting an optimum inter-network circuit in accordance with a circuit selection table defining inter-network circuits so as to correspond to the addressed network, said circuit selection table being provided in the gate stations;

wherein the representative gate station is not single, but can be defined for each switching destination;

wherein in case inter-network switching is impossible in said optimum gate station, another gate station is selected by means of said gate station selection table.

13. A switching network in an inter-network switching system, the switching network comprising:

a switch station connected to a calling terminal for receiving an inter-network switching call request;

a plurality of gate stations for transferring said inter-network switching call request to an adjacent network via an inter-network relay circuit in the inter-network switching system;

said switch station including means for transferring said inter-network switching call request to a representative gate station in accordance with an inter-network switching routing table defining said representative gate station representatively receiving said inter-network switching call request, said inter-network switching routing table being provided in said switch station; and each of said gate stations including means for retransfer said inter-network switching call request from said representative gate station to another of said gate stations in accordance with a gate station selection table defining an optimum gate station and means for transferring said inter-network switching call request to an optimum inter-network relay circuit in accordance with a circuit selection table defining said optimum inter-network relay circuit, said gate stations selection table and said circuit selection table being provided in each of said gate station.

* * * * *